(12) United States Patent
Andersen et al.

(10) Patent No.: US 9,761,858 B2
(45) Date of Patent: Sep. 12, 2017

(54) BATTERY TERMINAL COVER

(71) Applicants: Glenn W. Andersen, Hartford, WI (US); William J. Ross, Mukwonago, WI (US); Micah C. Mahnke, Whitefish Bay, WI (US); Jeff Hindman, Erie, PA (US)

(72) Inventors: Glenn W. Andersen, Hartford, WI (US); William J. Ross, Mukwonago, WI (US); Micah C. Mahnke, Whitefish Bay, WI (US); Jeff Hindman, Erie, PA (US)

(73) Assignees: Johnson Controls Technology Company, Milwaukee, WI (US); Polymer Molding, Inc., Erie, PA (US)

( * ) Notice: Subject to any disclaimer, the term of this patent is extended or adjusted under 35 U.S.C. 154(b) by 0 days.

(21) Appl. No.: 14/746,222

(22) Filed: Jun. 22, 2015

(65) Prior Publication Data

US 2015/0287975 A1    Oct. 8, 2015

Related U.S. Application Data

(62) Division of application No. 13/576,626, filed as application No. PCT/US2011/026290 on Feb. 25, 2011, now Pat. No. 9,093,700.

(60) Provisional application No. 61/308,769, filed on Feb. 26, 2010.

(51) Int. Cl.
*H01M 2/30* (2006.01)
*H01M 2/20* (2006.01)
*H01M 2/32* (2006.01)

(52) U.S. Cl.
CPC ............. *H01M 2/305* (2013.01); *H01M 2/20* (2013.01); *H01M 2/30* (2013.01); *H01M 2/32* (2013.01); *H01M 2220/20* (2013.01)

(58) Field of Classification Search
None
See application file for complete search history.

(56) References Cited

U.S. PATENT DOCUMENTS

| 2,145,135 A | 1/1939 | Ryalls |
| 3,726,717 A | 4/1973 | Zaleski |
| 4,562,125 A | 12/1985 | Davis |
| 4,761,354 A | 8/1988 | Poe et al. |

(Continued)

FOREIGN PATENT DOCUMENTS

| EP | 0 534 646 A2 | 3/1993 |
| WO | WO 2011/106679 | 9/2011 |

OTHER PUBLICATIONS

International Preliminary Report on Patentability and Written Opinion of International Searching Authority dated Sep. 7, 2012 for International Application No. PCT/US2011/026290.

(Continued)

*Primary Examiner* — Patrick Ryan
*Assistant Examiner* — Carmen Lyles-Irving
(74) *Attorney, Agent, or Firm* — Boardman & Clark LLP

(57) ABSTRACT

A battery terminal cover is provided. The battery terminal cover has a base arranged to cover a battery terminal root, a tower arranged to cover a battery terminal post, and a projection coupled to the battery terminal cover. The projection has a retention area for temporary storage of a later used fastener for coupling to the battery terminal post. A battery is also provided.

23 Claims, 7 Drawing Sheets

(56) References Cited

U.S. PATENT DOCUMENTS

| | | | |
|---|---|---|---|
| 5,015,543 A * | 5/1991 | English | H01R 11/289 |
| | | | 174/138 F |
| 5,023,154 A | 6/1991 | English | |
| 5,503,642 A | 4/1996 | Lippert et al. | |
| 5,733,152 A | 3/1998 | Freitag | |
| 5,789,099 A | 8/1998 | Kim | |
| 6,185,906 B1 | 2/2001 | Mogard et al. | |
| 6,346,793 B1 | 2/2002 | Shibata et al. | |
| 9,093,700 B2 | 7/2015 | Andersen et al. | |

OTHER PUBLICATIONS

International Search Report and Written Opinion of International Searching Authority dated May 31, 2011 for International Application No. PCT/US2011/026290.

* cited by examiner

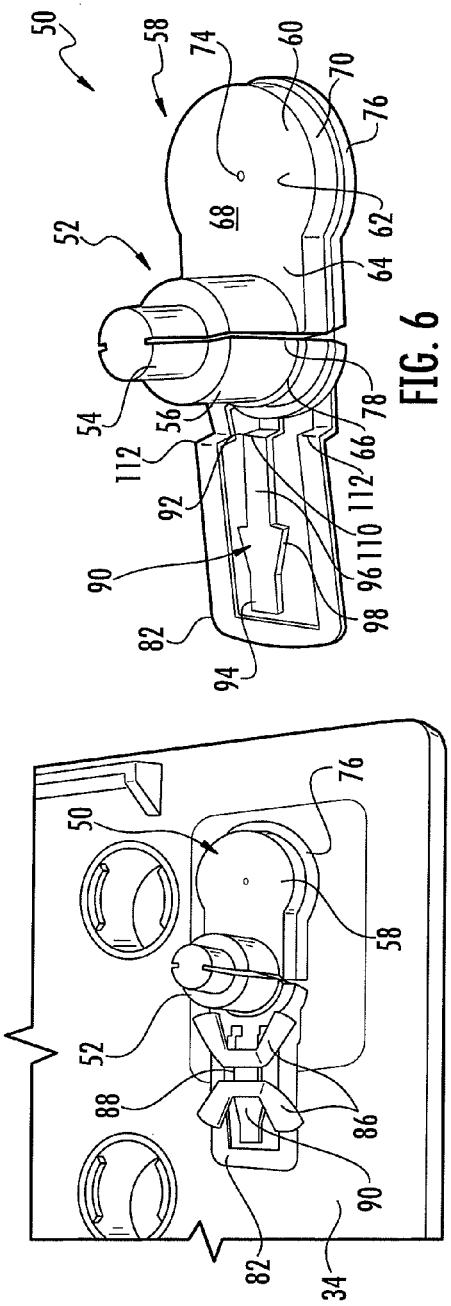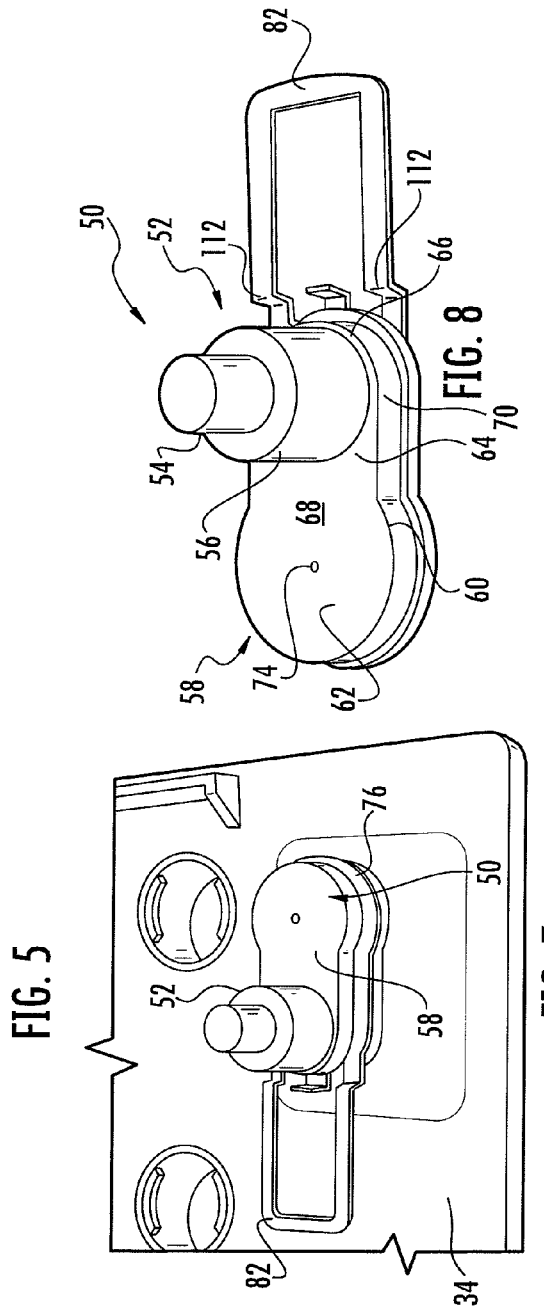

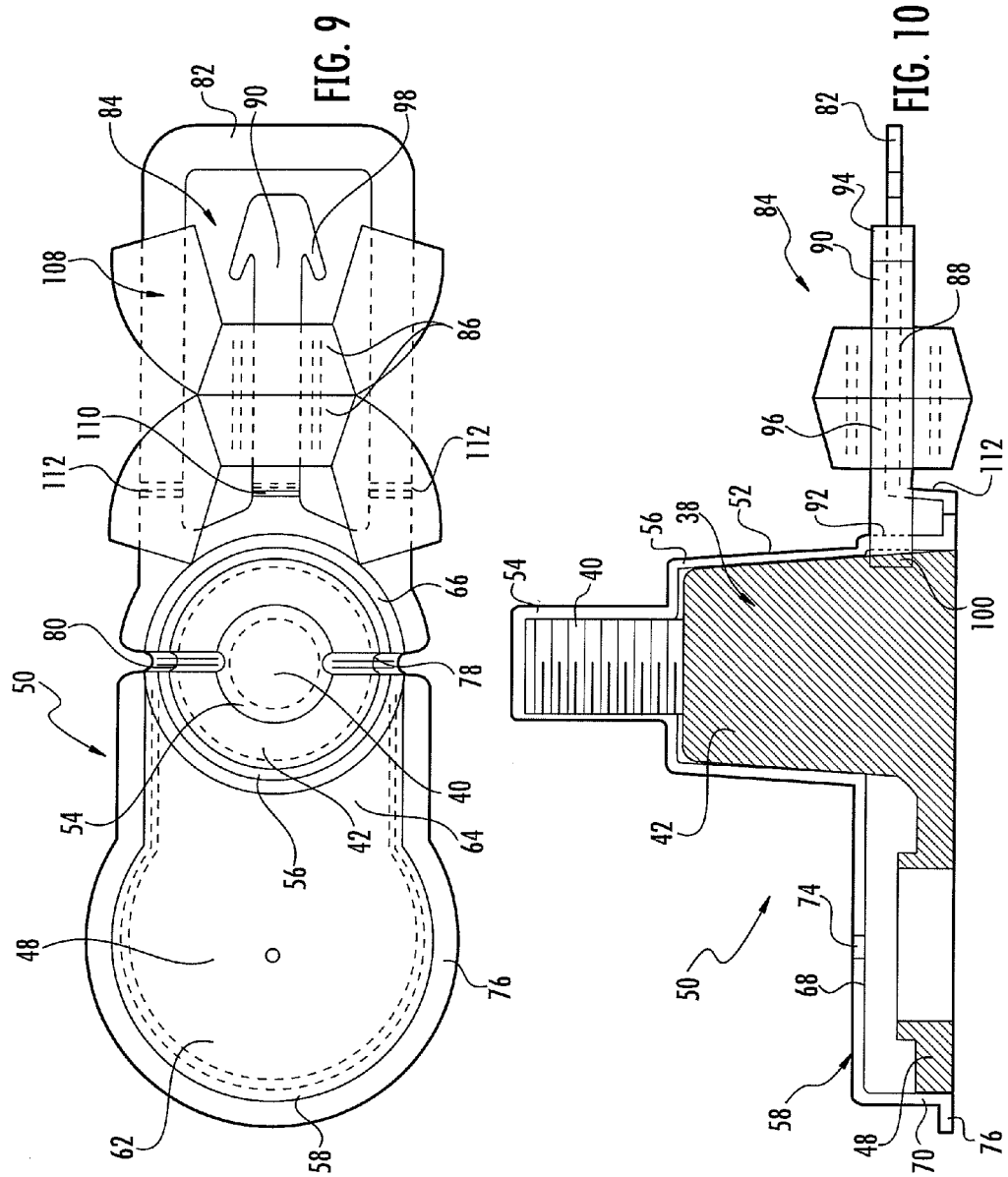

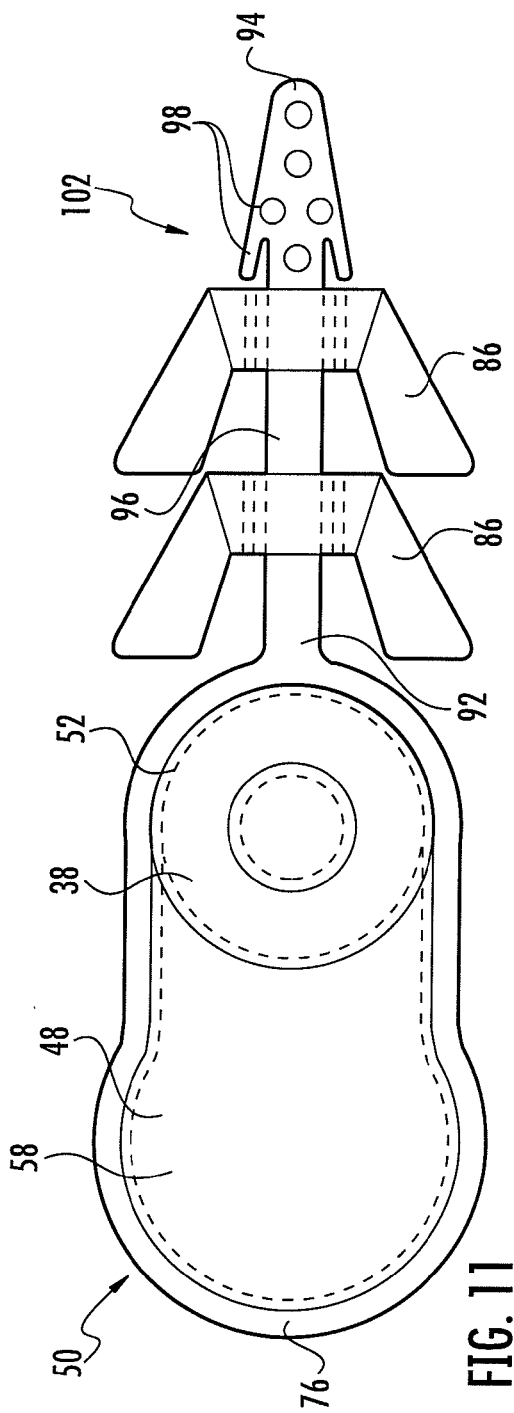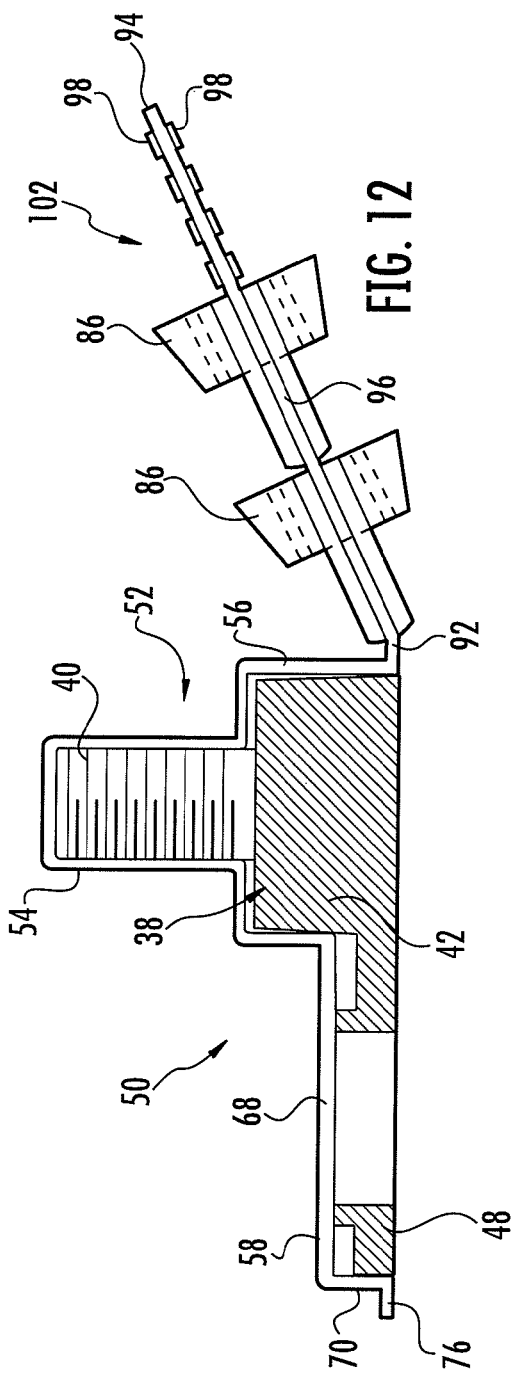

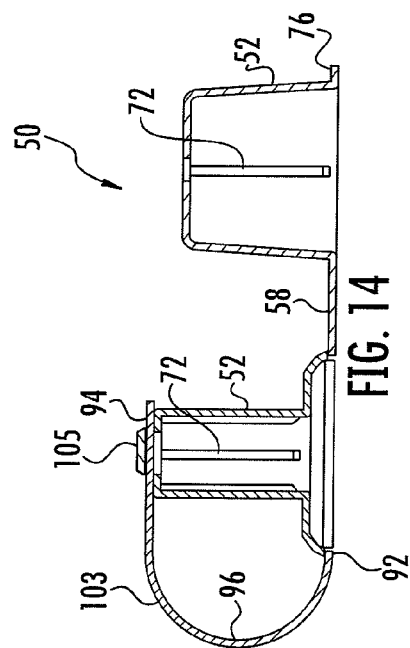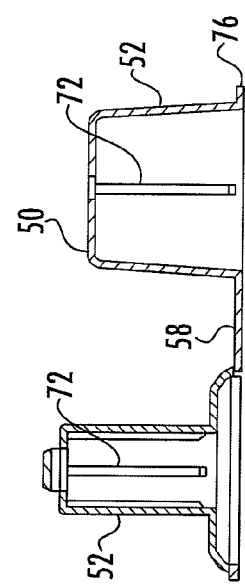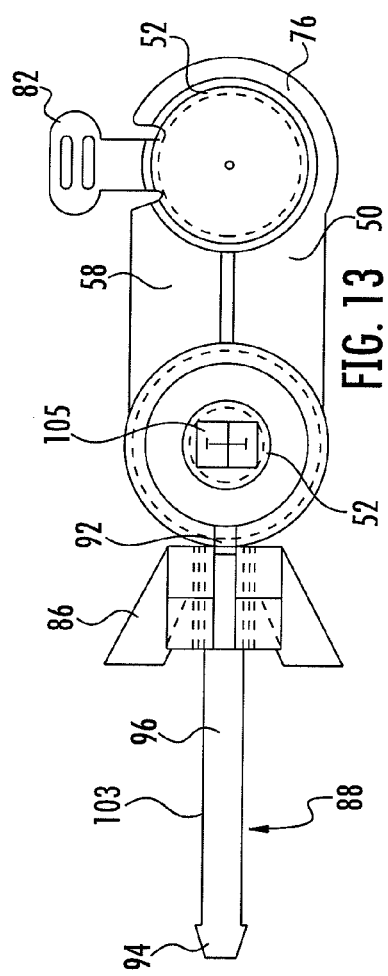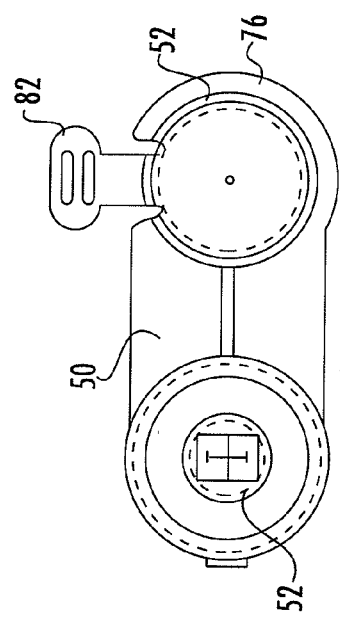

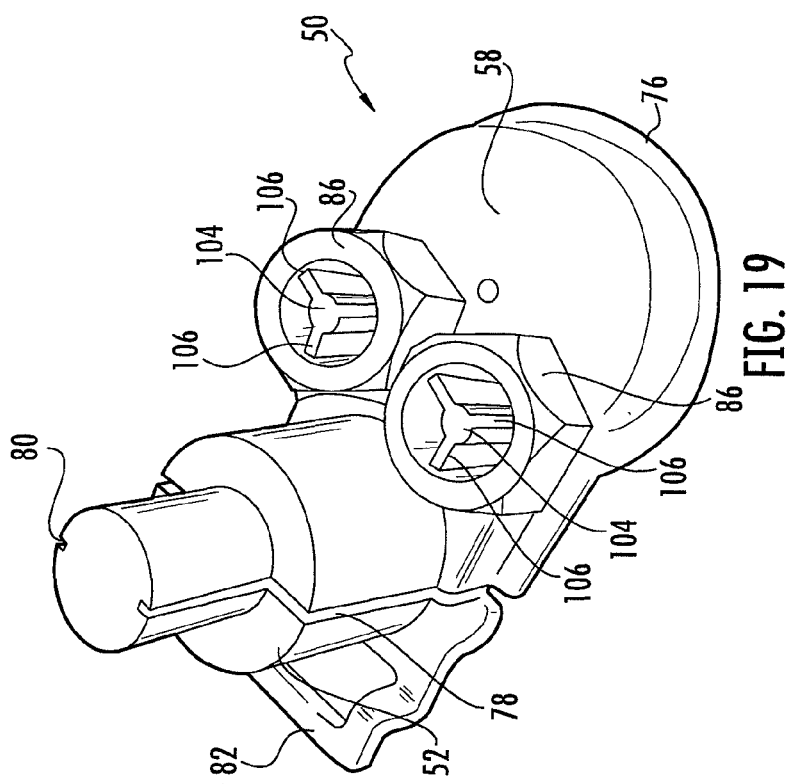
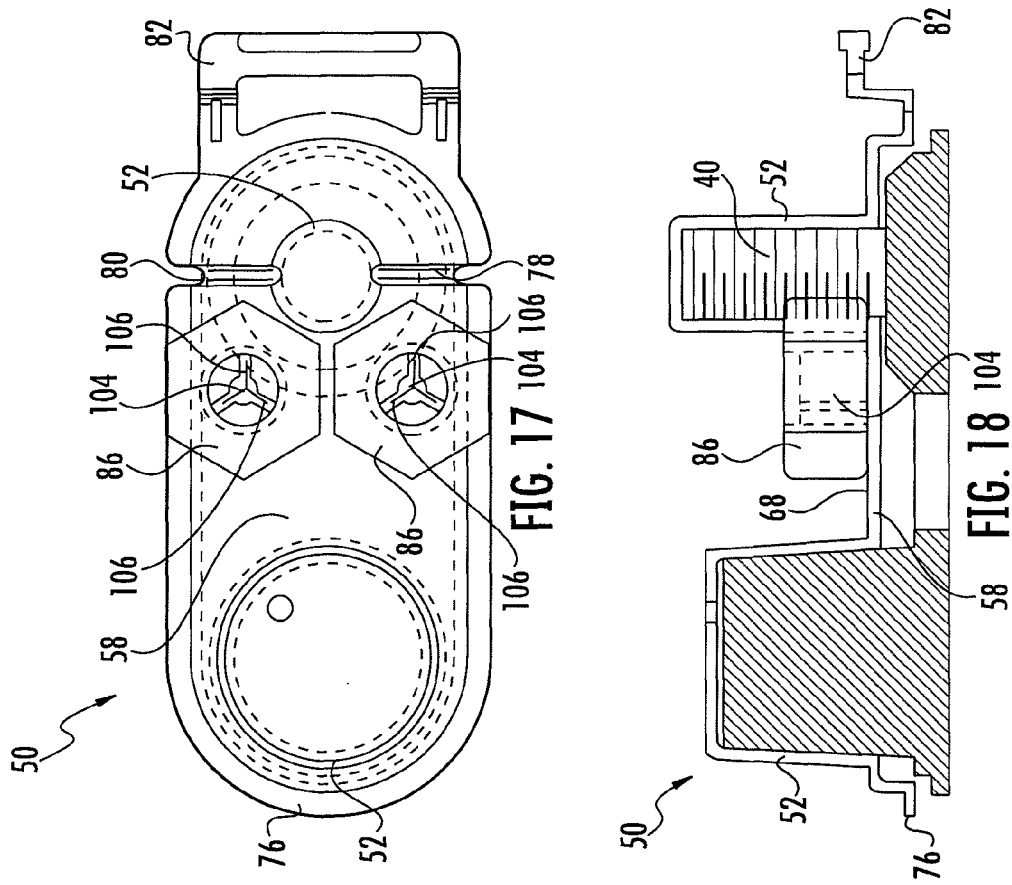

BATTERY TERMINAL COVER

CROSS-REFERENCE TO RELATED APPLICATIONS

This application claims priority as a divisional application of U.S. application Ser. No. 13/576,626 filed Aug. 1, 2012, which claims priority to U.S. Provisional Application 61/308,769 filed Feb. 26, 2010, entitled "Battery Terminal Cover," and International Application PCT/US2011/026290 filed Feb. 25, 2011, the entire contents of each of which are hereby incorporated by reference in their entirety herein.

FIELD

The present invention relates to the field of batteries (e.g. lead-acid batteries including batteries for vehicle starting, lighting and ignition applications; marine batteries; commercial batteries; industrial batteries; batteries for use with golf cars and carts, hybrid-electric vehicles, microhybrid vehicles, etc.). The present invention more specifically relates to a cover or cap for a battery terminal.

BACKGROUND

Secondary batteries employ terminals and terminal posts that project outwardly from a battery. It is known to provide a protector or cap for one or more of the terminals and/or terminal posts that may be used to help protect the terminals and/or terminal posts from damage and inadvertent discharge.

Certain types of secondary batteries must be connected by, for example a battery cable connector, between a battery terminal and a vehicle. On some such batteries a fastener is used to secure the cable connector to the battery terminal Often times these fasteners are nuts or wing nuts provided separately from the battery. In the alternative, the fasteners are provided in a bag or envelope that is provided with the battery. Unfortunately, such envelopes and bags are not durable, and are easily separated and lost. As a result, the end user often times does not receive a battery that includes the components necessary for assembly and/or connection of the battery. In addition, fasteners in a bag strapped or attached to the battery can lead to damage to the cover by scratching or denting the surface.

SUMMARY

Accordingly, a battery terminal cover is provided. The battery terminal cover has a base arranged to cover a battery terminal root, a tower arranged to cover a battery terminal post, and a projection coupled to the battery terminal cover. The projection has a retention area for temporary storage of a later used fastener for coupling to the battery terminal post.

A battery is also disclosed. The battery has a battery housing containing active battery elements, a cover secured to the battery housing, a positive terminal post, and a negative terminal post. The battery also includes a first battery terminal cover arranged to cover the positive terminal post and a second battery terminal cover arranged to cover the negative terminal post. A projection is coupled to at least one of the first battery terminal cover and the second battery terminal cover. The projection has an area for removable retention of a fastener.

BRIEF DESCRIPTION OF THE DRAWINGS

Various exemplary embodiments of the systems and methods according to the present disclosure will be described in detail, with reference to the following figures, wherein:

FIG. 5 is a cut away perspective view of a terminal post cover or cap provided on a terminal post for the battery shown in FIG. 2 according to one or more examples of embodiments, showing fasteners removably retained thereon;

FIG. 6 is a perspective view of the terminal post cover or cap shown in FIG. 5 without fasteners according to one or more examples of embodiments;

FIG. 7 is a cut away perspective view of a terminal post cover or cap for the battery shown in FIG. 2 according to one or more alternative examples of embodiments;

FIG. 8 is a perspective view of the terminal post cover or cap shown in FIG. 7 according to one or more alternative examples of embodiments;

FIG. 9 is a top plan view of the terminal post cover or cap shown in FIG. 5 provided on a terminal post for the battery shown in FIG. 2 according to one or more examples of embodiments;

FIG. 10 is a cross-sectional view of the terminal post cover or cap and terminal post for the battery shown in FIG. 2 in one or more examples of embodiments;

FIG. 11 is a top plan view of a terminal post cover or cap provided on a terminal post for the battery shown in FIG. 2 according to one or more alternative examples of embodiments;

FIG. 12 is a cross-sectional view of the terminal post cover or cap and terminal post shown in FIG. 11 for a battery;

FIG. 13 is a top plan view of a terminal post cover or cap provided on a terminal post for a battery according to one or more alternative examples of embodiments, showing the projection disengaged from a mating receptor;

FIG. 14 is a cross-sectional view of the terminal post cover or cap shown in FIG. 13, showing the projection engaged with the mating receptor;

FIG. 15 is a top plan view of a terminal post cover or cap provided on a terminal post for a battery according to one or more alternative examples of embodiments;

FIG. 16 is a cross-sectional view of the terminal post cover or cap shown in FIG. 15;

FIG. 17 is a top plan view of a terminal post cover or cap provided on a terminal post for a battery according to one or more alternative examples of embodiments;

FIG. 18 is a cross-sectional view of the terminal post cover or cap and terminal post shown in FIG. 17; and FIG. 19 is a perspective view of a terminal post cover or cap for the battery and terminals shown in FIG. 2 according to one or more alternative examples of embodiments.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
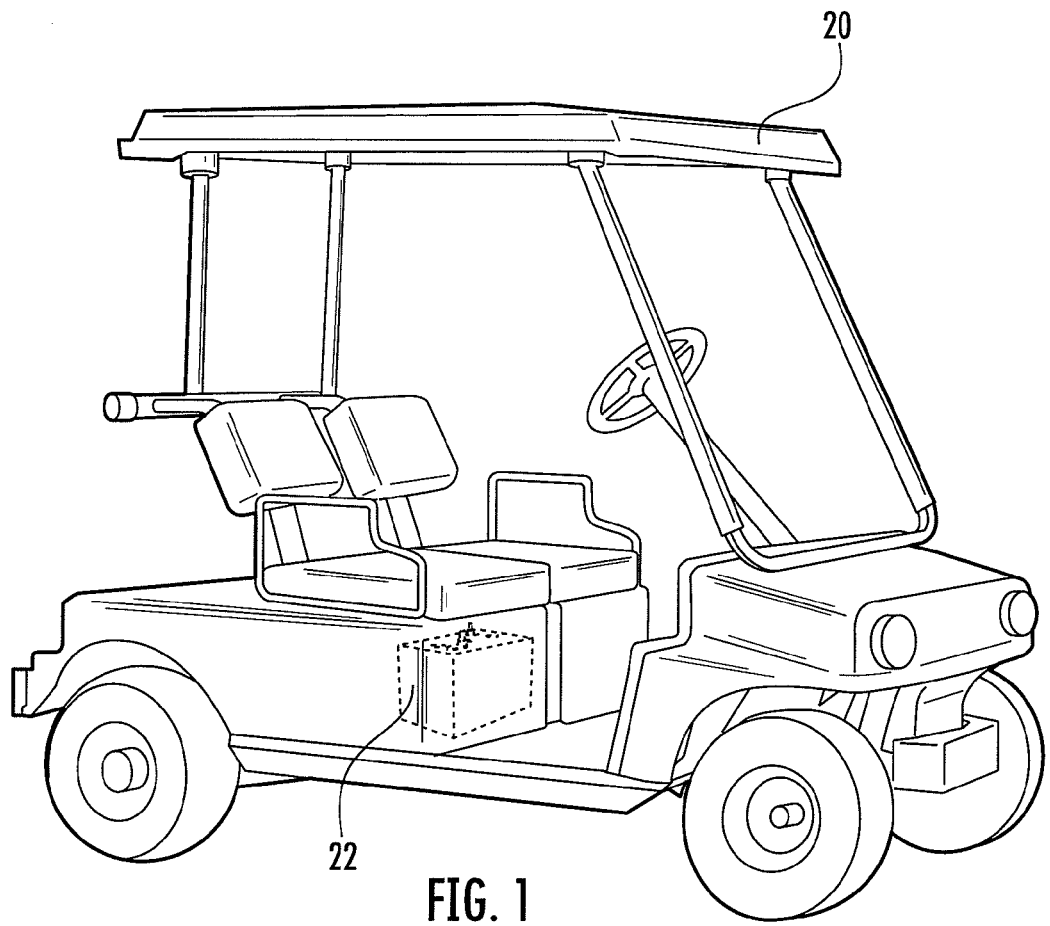
FIG. 1 is a perspective view of a vehicle including a battery according to one or more examples of embodiments.
Figure 2:
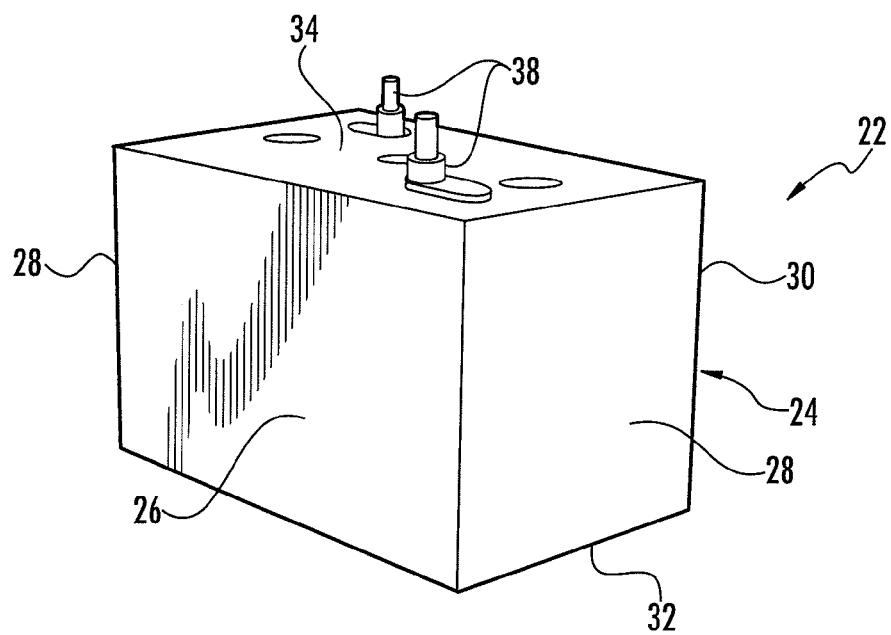
FIG. 2 is a perspective view of a battery according to one or more examples of embodiments.

Referring to FIGS. 1-2, a vehicle 20 is shown that includes a battery 22 according to one or more examples of embodiments. Vehicle 20 is shown as a golf car or cart. To this end, the illustrations provided herein relate to golf car and cart, as well as to marine applications. However, it will be obvious to those skilled in the art after reading this specification that the disclosed innovations may have any number or applications including various marine applications, automotive applications, and other applications where a rechargeable battery may be needed. Accordingly, while the vehicle 20 is shown as an automobile and in particular a golf cart, according to one or more examples of alternative embodiments, the vehicle 20 may comprise any variety of or types of vehicles including, among others, automobiles, golf cars or carts, lawn/garden tractors, motorcycles, buses, recreational vehicles, boats and other marine vehicles, and the like. According to one or more examples of embodiments, the vehicle 20 uses a rechargeable battery for locomotive purposes. However, the vehicle 20 may use an internal combustion engine or combination of internal combustion engine and rechargeable battery 22 for locomotive purposes.

The battery 22 shown in FIG. 1 is configured to provide at least a portion of the power required to start or operate the vehicle 20 and/or various vehicle systems (e.g., starting, lighting and ignition systems). Further, it should be understood that the battery 22 may be utilized in a variety of applications not involving a vehicle, and all such applications are intended to be within the scope of the present disclosure.

The battery 22 described herein, examples of which are shown in FIGS. 1 and 2, may include any type of secondary battery (e.g., rechargeable battery). According to one or more examples of embodiments, the battery 22 is a lead-acid storage battery. Lead-acid storage batteries may be either sealed (e.g., non-maintenance) or unsealed (e.g., wet). For example, the lead-acid storage battery may be an unsealed lead-acid battery that periodically requires the addition of electrolyte and/or water to maintain a desired volume and/or concentration of either or both.

In various examples of embodiments, as shown in FIG. 2, the battery housing 24 includes a box-like base or container 24 and may be made of a moldable resin. Battery 22 or battery housing 24 includes or forms a compartment or container having a front wall 26, end walls 28, a rear wall 30 and a bottom wall 32. In various embodiments, cell partitions or dividers (not shown) may be provided between the end walls 28, resulting in the formation of the compartments. In various examples of embodiments, the lead-acid storage battery 22 includes active battery elements, such as several cell elements (not shown) which are provided in separate compartments of the container 24 or housing containing electrolyte. One or more examples of a battery 22 include a plurality of plate blocks (not shown) connected in series according to the capacity of the lead storage battery and accommodated in the battery container 24 or housing together with electrolyte, which is most commonly aqueous sulfuric acid. In various examples of embodiments, a plate block or cell element (not shown) is located in each compartment.

While a specific form of battery is described for purposes of example, the invention described herein is not limited to such an arrangement as one of skill in the art would understand the battery terminal cover described herein may be applicable to any existing or future developed current transmission device similar or comparable to a terminal for a battery.

Figure 3:
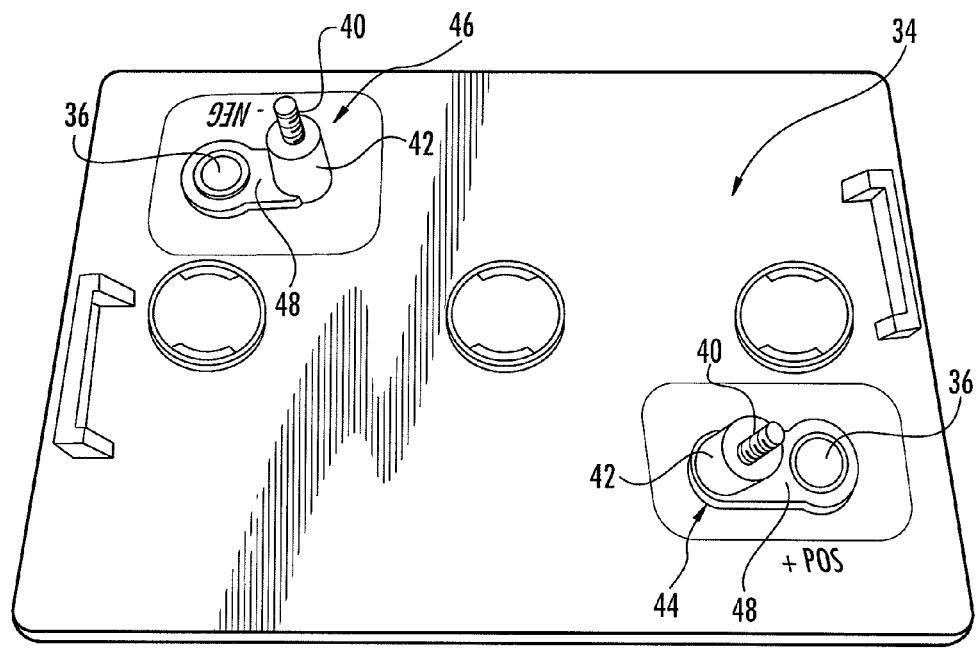
FIG. 3 is a perspective view of a battery cover for the battery shown in FIG. 2 according to one or more examples of embodiments.

As shown in FIGS. 2 and 3, a cover 34 is provided for the housing or container 24, and in various embodiments, the cover 34 may include terminal bushings and fill tubes to allow electrolyte to be added to the cells and to permit servicing. To prevent undesirable spillage of electrolyte from the fill tubes, and to permit exhausting of gases generated during the electrochemical reaction, a battery 22 may also include one or more filler hole caps and/or vent cap assemblies (not shown).

Secondary batteries, such as illustrated in the Figures, employ a number of types of terminals. Various examples of terminals are shown in the Figures for purposes of illustration only (compare FIGS. 2, 3, 10, 12, 13, 15, and 18). At least one positive terminal 44 and at least one negative terminal 46 may be found on or about the battery cover 34 and/or front compartments of the battery 22. To this end, terminals 44, 46 may be located on the cover 34 or top of the battery 22, on the front, back or side surfaces of the battery housing 24, as well as on both the top 34 and front 26/back 30 or side 28 surfaces. In the illustrated example, the terminal 44, 46 includes an external terminal post 38 projecting outwardly from the battery 22. In one or more examples of a battery terminal 44, 46, the external terminal post 38 may include a threaded stud 40 adapted for mating with an eyelet on a battery cable and/or may include a portion 42 which is tapered or a tapered post often referred to as an SAE terminal post. Terminals 44, 46 may include bushings or other portions which may extend through the cover 34 and/or the front 26 of the battery housing 24, depending upon the battery design. In various embodiments, the terminals also may extend through a terminal post seal assembly to help prevent leakage of acid. In various embodiments, the cover 34 may also include one or more cover mold inserts of the same or varying size or shape depending upon the desired configuration (e.g., polarity) and/or terminals of the battery 22 (not shown) having bushings that receive or are adapted to receive a post and/or a portion of a cast-on-strap passing into and/or through cover 34. Similarly, the positive and negative terminals 44, 46 may be sized or shaped differently.

Referring to FIG. 3, in various examples of embodiments, the battery terminal post 38 may be axially offset from an internal cell element post 36 which couples the battery terminal post to the battery's internal cell element through the cover 34. In various embodiments, and as shown in FIG. 3, the battery terminal 44, 46 includes a root portion 48 formed integrally with the external post 38 and the internal cell element post 36 and extending into and, in some cases, through the cover 34. One or more of these components of the terminal 44 or 46 may be integrally formed as a unitary piece. It is contemplated that the battery terminal post 38 may not be offset from an internal cell element 36 and/or may not include a root 48. The battery terminal 44, 46 may also be of any shape, such as previously shown and described, as well as a tombstone configuration, L-shape, truncated cone, tabs, etc. The battery terminal base or root 48 may also extend from the top or cover 34 and wrap around a portion of the battery 22 to the side 26, 28, or 30, with a terminal post extending therefrom.

It will be recognized that the foregoing presents one or more examples of terminal forms, types and arrangements. A variety of terminal forms, types and arrangements are known and acceptable for use with the terminal cover described herein. Further, while the Figures and description illustrate certain examples of terminals, one of ordinary skill in the art will appreciate that any variety of types of known or later-developed terminal and/or bushing sizes, shapes and/or arrangements may be utilized in association with the battery terminal covers described in one or more examples of embodiments. It will be further recognized that these terminal arrangements may be top, side or corner configurations or combinations thereof. It will also be recognized that various polarity configurations are available and may be used with the battery described herein.

Figure 4:
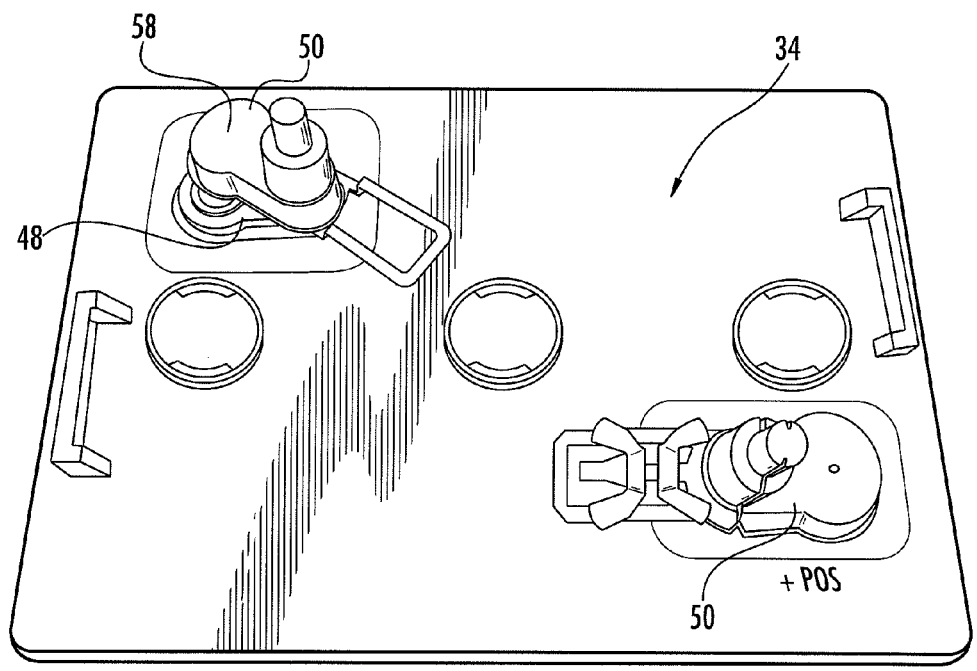
FIG. 4 is a perspective view of a battery cover of FIG. 3 for the battery shown in FIG. 2 and terminal post covers or caps according to various examples of embodiments, showing one of the battery terminal covers being rotated to reveal the terminal.

As shown in FIG. 4, in various examples of embodiments, one or more battery terminal covers 50 or caps are provided and arranged to cover a battery terminal. The battery terminal cover 50 is shaped and sized to mate with or fit over or otherwise cover at least a portion of the battery terminal 44 or 46, and in one or more examples of embodiments covers all or substantially all of the exposed battery terminal 44 or 46 above or on the battery cover 34. Referring generally to FIGS. 4-18, the battery terminal cover 50 or cap may include an annular or conical or semi-conical or tapered body or tower 52 adapted to receive and/or substantially fit a battery terminal post 38. To this end, the tower 52 may be sized and/or shaped to fit over or cover the respective terminal post and/or its associated components, such as but not limited to, the threaded stud 40, tapered portion 42, a tombstone, other shaped terminal posts, and combinations of the foregoing.

The tower 52 may have more than one segment of varying size, shape or diameter. For example, the tower 52 for use with a post as illustrated in FIGS. 4-12 and 19 may have a narrowed diameter segment 54 and a larger diameter segment 56 where said terminal cover 50 is adapted to cover a battery terminal post 38 that has threaded portion 40 seated on the battery terminal for retention of a battery cable connector. Alternatively, the post and tower may largely be of one width, shape or diameter as shown in FIGS. 13-18.

FIG. 4 illustrates two examples of embodiments of the battery terminal cover 50 or cap having a tower 52 adapted for fitting to a terminal post 38 including a threaded stud 40. In addition, the cover 50 in FIG. 4 and shown more specifically in FIGS. 5-8 includes a base 58 adapted or sized and shaped to fit over a root portion 48 integral to the battery terminal or a portion of the root 48. The tower may be provided without the base and the base provided without the tower. In FIGS. 4-8, the tower 52 is coupled a base 58 sized, shaped or otherwise adapted to receive and/or substantially fit or integrally formed with the root portion 48 of a battery terminal or a portion thereof. In this regard, in the illustrated example the base 58 is formed by a body 60 having a circular segment 62, a rectangular segment 64, and a semicircular end segment 66 opposite the circular segment, each of which covers a correspondingly shaped portion of the root 48. The base body 60 also includes a substantially flat top wall or surface 68 and vertical side walls 70. The foregoing example is for purposes of illustration only, and any suitable shape of the body 60 which mates with a correspondingly shaped root 48 may be acceptable for the purposes provided.

In various embodiments, the tower 52 and/or the base 58 of the cover 50 are adapted or provided with crush ribs 72 (see FIGS. 14, 16) or a deformable surface on the interior surface of the tower and/or base, or provided with other means to tightly fit a battery terminal. For example, one or more crush ribs may be provided on an inner circumference of the tower 52 or vertical sidewalls 70 of the base 58 and formed to frictionally engage or crush against the side surfaces of the battery terminal post or root so as to removably, but tightly secure the battery terminal cover 50 or cap to the battery terminal. Alternatively or in addition, a locking device (not shown) may be included to secure the cover on the terminal. To improve installation, the tower 52 and/or the base 58 may also define or include holes or apertures 74 that allow air to escape as the battery terminal cover 50 or cap is provided over a terminal post. One of skill in the art would understand the cover may be provided with any suitable shape and features to correspond to the shape of the terminal or otherwise fit over the terminal and secure it thereon.

As can be seen in FIGS. 5-19, in various examples of embodiments, the battery terminal cover 50 or cap may also include a skirt 76 or flange along portions of the margin or lower portion of the base 58. The skirt 76 or flange in the illustrated embodiment extends outward from the lower edge or a portion of the base 58 and surrounds, or partially surrounds, the base.

In various embodiments, the cover 50 may also include a feature adapted to permit ready manual separation of the terminal cover 50 or cap from the terminal 44 or 46 on which it is provided. As shown in FIGS. 5-6, the base 58, tower 52 and/or skirt 76 defines or includes a weakened portion 78. In the illustrated embodiment, the weakened portion 78 is a slit and/or a tear membrane and/or a perforated portion. It should be appreciated that the terminal cover 50 or cap may include any number of different types of features (e.g. perforations or links or tear membrane, and the like) that may be adapted to permit ready manual separation of the terminal cover 50 or cap from the terminal. In the examples shown in the Figures, the weakened portion 78 extends from the lower edge of the base 58 to the top of the tower 52, but variations thereon are acceptable for the purposes provided. As can also be seen in FIGS. 6 and 9, the tear membrane 78 may include a separated segment or slit at the base 58 or in the skirt 76. In addition, a second or additional tear membrane(s) 80 (FIG. 9) may be provided on the terminal cover 50 having similar or identical features. In the illustrated embodiment, the second tear membrane 80 is provided on the side of the terminal cover 50 opposite to the first tear membrane 78. However, any number and placement of tear membranes may be acceptable for the purposes provided.

The battery terminal cover 50 or cap may include additional or alternative features adapted to permit ready manual separation of the terminal cover 50 or cap from the terminal 44 or 46 on which it is provided. For example, in various embodiments, and as shown in FIGS. 5-10, 13, 15 and 17-19, a member or manual separation member or device 82 is coupled to the base 58 or skirt 76. While a base 58 or skirt 76 are specifically described, any attachment location for usable attachment of the manual separation member 82 and suitable for removal of the terminal cover 50 may be acceptable for the purposes provided. The manual separation member or device 82 may be any device adapted to forcibly or physically remove the battery terminal cover 50, or to aid in removing the battery terminal cover 50, from the battery terminal 44, 46. Examples of suitable devices include, but are not limited to, a pull-ring or handle or pull tab. The member 82 is arranged such that it may be grasped by hand and used to pull or otherwise remove the terminal cover 50 or cap from the terminal. The manual separation device 82 may be integrally formed on or with the terminal cover 50 or may be a separate device attached to or usable with the cover 50. In addition, the manual separation device 82 may be provided in combination with the weakened portion 78 of the terminal cover 50. For instance, the manual separation device 82 may be provided adjacent to a slit or tear membrane 78 such that the user may grasp the device 82 and tear or separate the terminal cover 50 along the weakened portion 78.

A retention device 84 (see, e.g. FIG. 9) or projection having a retention area for securing one or more later used fasteners 86 may also be provided on the battery terminal cover 50. The retention device 84 has an area 88 adapted to retain the later used fastener 86. The retention device 84 may be a projection 90, as shown in FIGS. 5-6 and 9-14, having a proximal end 92 and a distal end 94. In various embodiments, the proximal end 92 of the projection 90 or 102 is coupled to the terminal cover 50, such as to the base 58, skirt 76, or tower 52 of the battery terminal cover 50 or cap. The projection 90 or 102 in the illustrated example is a shaft 96 that extends between a proximal end 92 and a distal end 94 and has a sufficient length to contain one or more fasteners 86. For example, the projection 90 or 102 may have a length or height having an area which is adapted to secure one fastener, or a plurality of fasteners in a stacked fashion. The projection 90 or 102 is also of sufficient width or strength to support one or more fasteners 86. The projection 90 or 102 may include retention features 98 as shown in FIGS. 9, 11-12 to removably retain one or more fasteners 86. For example, barbs, dimples, ridges, teeth, crush ribs, zip-ties, phillips-head shape or star-shaped elements, or the like, or a combination of any one or more of the foregoing, may be formed or otherwise provided at or near the distal end of the projection, or anywhere along its length to retain a fastener 86 or plurality of fasteners in the retention area 88 of the shaft 96. Preferably, the retention features 98 are malleable, bendable, separable, or otherwise adapted to retain, but permit removal of the fasteners 86 carried by the projection 90, 102. The retention feature 98 may also be a shaft 96 having a width sufficient to form a friction fit with the fastener(s) 86.

As shown in FIG. 10, the battery terminal cover 50 or cap may also include an element 100, aperture, or the like adapted to receive the proximal end 92 of the projection 90 while the distal end 94 includes a retention feature 98 to retain a fastener(s) 86. For example, the proximal end 92 of the projection 90 may be fed into or through a cover connection element 100 that may be coupled to the tower 52 as shown in FIG. 10. In various embodiments, the element 100 and/or proximal end of the projection are configured (e.g. with barbs or other securing means) to help removably retain the projection in or near the element 100 on the cover 50. In one or more examples of embodiments, the element 100 may include a ratchet mechanism or pawl or click-device adapted to engage ridges or teeth on the projection.

Similarly, as shown in FIGS. 13-14, the distal end 94 of a projection 103 may be provided with a retention feature that mates with a corresponding receptor 105 a cover connection element on a tower 52. Fasteners 86 may be placed on the retention area 88 of the projection 103 and the retention feature or distal end 94 then inserted into the receptor 105 to secure the projection in place. Similar to element 100, the retention feature or distal end 94 and/or receptor 105 may include barbs, a ratchet mechanism, a click device or pawl that engages ridges or teeth, or hook and loop type arrangement, or a device that otherwise removably secures the distal end 94 in the receptor 105.

In various embodiments, at least one projection is coupled to the battery terminal cover 50, but a plurality of projections (see FIGS. 17-19, projection 104) may be coupled to the cover 50. In certain examples of embodiments, a plurality of projections are provided on the terminal cover 50. In addition, a battery 22 may include a plurality of terminals, such as a positive terminal 44 and a negative terminal 46. The battery 22 may be further provided with a plurality of battery terminal covers 50. In one or more examples of embodiments, more than one battery terminal cover 50 on the battery 22 may include a projection 90. In the alternative, only one battery terminal cover 50 may include a projection 90, or plurality of projections or may include a projection for the retention of multiple fasteners 86.

The retention device 84 for retention of a fastener 86 may also be coupled to the base 58 (e.g. as shown in FIGS. 17-19). In one or more examples of alternative embodiments, the retention device is formed of or includes a projection 104 or multiple projections secured or coupled to the base 58. In the illustrated example shown in FIGS. 17-19, two projections 104 are provided and secured to the top wall or surface 68 of the base 58. While specific examples of attachment locations are provided, it is understood that any location suitable for support and retention of a fastener may be acceptable for purposes of the present invention. In the illustrated example, the projections 104 have a width or outer diameter which corresponds to the diameter of an aperture in the fastener(s) 86. In addition, the projections 104 may be provided with one or more crush ribs 106, or for example a "star" shape, or "phillips-head" shape, or "y-shape", or the like which provides contact surfaces for tight contact with the aperture of the fastener(s) 86, such that the fastener may be pressed onto and secured by friction to the projection 104. Any number of ribs may be provided. The projections 104 may have a length or height which is adapted to secure one fastener, or a plurality of fasteners in a stacked fashion.

The projection 90 or 102 or 103 or 104 and/or the manual separation member 82 may also be positioned to help provide some separation between the battery cover 34 and the one or more fasteners 86 removably retained by the projection, or otherwise support and/or help retain the fasteners. For example, as shown in FIGS. 5-6 and 9-10, the member 82 and projection 90 are coupled to the skirt 76 but include a step or an offset 110, 112. The offset provides additional separation between the battery cover 34, the manual separation member 82 and projection 90. In addition, the manual separation member 82, may provide a support or separation or barrier between the fastener 86 and the cover 34, and may further be arranged for a tight fit of the fastener upon the retention device or projection. In the illustrated example of FIG. 9, the manual separation member 82 has a surface 108, or rest surface, upon which a portion of the fastener 86 may be carried. Moreover, the projection 90 may be elevated or offset above the manual separation member 82. To this end, the projection 90 may be provided with a step or offset 110 which is greater than the step or offset 112 of the manual separation member 82. In one or more examples of other embodiments, the projection 90 may be coupled to the skirt 76, but include a bend along its length. For instance, the bend may angle the projection 102 away from the battery cover 34 such that the distal end 94 of the projection is spaced further from the battery cover 34 than the proximate end 92 of the projection (see FIG. 12).

While various retention devices for later used fasteners are shown, as can also be seen by reference to FIGS. 4, 7-8, and 15-16, a battery terminal cover 50 can be provided without such a device.

The battery terminal cover 50 or cap and corresponding components may be made of any suitable materials. In various examples of embodiments, the battery terminal cover 50 or cap is constructed of one or more dielectric materials. The battery terminal cover 50 or cap may be constructed of a low density polyethylene or plastic. In one or more examples of embodiments, the battery terminal cover 50 or cap may be colored or include a portion which is colored. For example, a cover intended to be provided on a positive terminal may be at least partially colored red, while the battery terminal cover 50 or cap intended to be provided on a negative terminal may be at least partially colored black. It is understood that the battery cover or cap may be any color or combination of colors.

The battery terminal cover 50 is preferably integrally formed or molded into a unified or unitary member. To this end, the cover may be molded, stamped or otherwise formed. The tear membranes 78 may be formed by stamping thereon, by incision, punch, or by any suitable means of forming a separable material or perforations or slits. While specific examples are provided, any current or future developed manufacturing method for forming a terminal cover 50 having the properties described herein may be suitable for purposes of this invention.

The fastener 86, or later used fastener removably attached to the terminal cover 50 may be any suitable fastener which may be used for securing the terminal 44, 46 and a battery terminal connector together, or for suitable connection of other electrical connection elements. For example, the fastener may be a hex nut or wing nut or cap that may be threaded or secured onto the threaded stud 40 upon which an eyelet or connector or wire on a battery cable has been overlaid in electrical contact or communication with a portion of a terminal post. Clamping devices, crimped connectors, wound wire connectors, snap-fit devices, and other connection devices may also be acceptable for purposes of the present invention. While specific examples are provided, any currently known of later developed fastener for "down-stream" or later use generally with a battery 22 may be acceptable for the purposes provided.

The battery terminal cover provided herein has many advantageous features. For instance, the terminal cover includes a base and a tower, which is more quickly and/or easily placed on at least a portion of a battery terminal. The terminal cover also includes a base and tower that may be removably, but tightly secured to at least a portion of a battery terminal. Specifically, the base and/or tower may include a weakened portion (e.g. a tear membrane or perforated portion) that allows that terminal post cover or cap to be more easily or readily removed from a battery terminal. The terminal cover described herein further provides a manual separation member and/or a weakened portion on the terminal post cover or cap which is easily separated and that may be utilized to easily and conveniently remove the terminal post cover or cap from a battery terminal. In addition, the battery terminal cover is provided with a retention device, or retention area such as a projection coupled to the terminal post cover or cap, that may be utilized to temporarily or removably retain one or more later used fasteners adapted to, or intended to, help couple or connect a battery cable connector to a battery terminal post, providing necessary "downstream" assembly or attachment mechanisms and/or devices in a readily available location for the end user, as well as a mechanism to keep such devices together during shipping and storage. The terminal cover described herein which includes the above-described features, such as a retention device and/or manual separation member, also helps protect the battery or battery cover from possible damage caused by fasteners temporarily or removably retained by a retention device on a terminal post cover or cap. The terminal cover further helps prevent damage to the terminal posts and/or root portions and/or helps prevent inadvertent discharge of the battery incident to short circuiting of the terminals due to its complete or substantial coverage of the battery terminal.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the battery or battery terminal covers as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various exemplary embodiments without departing from the spirit or scope of the present inventions.

The invention claimed is:

1. A battery terminal post cover comprising:
a base including a top surface and one or more side walls;
a tower connected to the base having a height which extends perpendicularly from the top surface of the base in a direction opposite the one or more side walls; and
a projection coupled to an exterior surface of the battery terminal post cover and projecting away from the base such that the projection is accessible when the tower is positioned over the battery terminal post;
wherein the base and tower are sized to cover a battery terminal.

2. The battery terminal post cover of claim 1, further comprising a retention feature accessible when the tower is positioned over the battery terminal post, the retention feature being selected from the group consisting of barbs, dimples, ridges, teeth, crush ribs, and combinations thereof.

3. The battery terminal post cover of claim 1, wherein the projection is a shaft with a proximal end proximate the cover and a distal end extending from the cover.

4. The battery terminal post cover of claim 3, wherein the distal end of the projection is coupleable to the cover.

5. The battery terminal post cover of claim 2, wherein the retention feature is positioned on a distal end of the projection.

6. The battery terminal post cover of claim 2, wherein the projection has a cover connection element arranged to removably retain the retention feature on the cover.

7. The battery terminal post cover of claim 1, wherein the battery terminal post cover has a skirt.

8. The battery terminal post cover of claim 1, wherein the projection is seated on the base and includes a plurality of radially spaced ribs.

9. The battery terminal post cover of claim 8, having a plurality of said projections.

10. The battery terminal post cover of claim 8, wherein a fastener is seated over the ribs.

11. The battery terminal post cover of claim 1, further comprising a portion provided on the cover enabling removal of the cover from the battery terminal.

12. The battery terminal post cover of claim 11, wherein the portion is a tear membrane.

13. The battery terminal post cover of claim 11, wherein the portion is a perforated portion.

14. The battery terminal post cover of claim 1, further comprising a manual separation member coupled to the cover used to remove the cover from the battery terminal.

15. The battery terminal post cover of claim 14, wherein the manual separation member is selected from the group consisting of a pull tab, a pull ring, and a handle.

16. A battery having the battery terminal post cover of claim 1 on a battery terminal post.

17. The battery terminal post cover of claim 1, wherein the tower is a first tower and the base also connects to a second tower.

18. The battery terminal post cover of claim 1 wherein the retention area is received by a removable fastener for the storage of the fastener.

19. A battery terminal post cover comprising:
a base including a top surface and one or more side walls;
a skirt;
a tower connected to the base which extends perpendicularly from the top wall or surface of the base in a direction opposite the one or more side walls; and
a projection coupled to the base or skirt of the battery terminal post cover and projecting away from the base such that the projection is accessible when the tower is positioned over a battery terminal post, the projection comprising a manual separation member.

20. The battery terminal post cover of claim 19, further comprising a retention area coupled to an external surface of the base, skirt, or tower which is accessible when the tower is positioned over the battery terminal post.

21. The battery terminal post cover of claim 19, further comprising a second tower connected to the base which extends perpendicularly from the top wall or surface of the base.

22. The battery terminal post cover of claim 19, wherein the manual separation member is selected from the group of a pull-ring, handle, or pull tab.

23. A battery having the battery terminal post cover of claim 19 on a battery terminal post.

* * * * *